United States Patent
Bruce et al.

(10) Patent No.: US 12,450,261 B2
(45) Date of Patent: *Oct. 21, 2025

(54) TECHNIQUES FOR DATA RETENTION

(71) Applicant: Salesforce, Inc., San Francisco, CA (US)

(72) Inventors: Jonathan Bruce, San Rafael, CA (US); Eli Levine, San Francisco, CA (US); Simon Toens, San Francisco, CA (US); Ian Varley, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,970

(22) Filed: Jun. 25, 2024

(65) Prior Publication Data

US 2024/0411769 A1  Dec. 12, 2024

Related U.S. Application Data

(63) Continuation of application No. 18/049,117, filed on Oct. 24, 2022, now Pat. No. 12,056,138, which is a continuation of application No. 16/853,572, filed on Apr. 20, 2020, now Pat. No. 11,507,589, which is a continuation of application No. 14/542,353, filed on Nov. 14, 2014, now Pat. No. 10,628,387.

(60) Provisional application No. 61/905,457, filed on Nov. 18, 2013, provisional application No. 61/905,460, filed on Nov. 18, 2013, provisional application No. 61/905,439, filed on Nov. 18, 2013, provisional application No. 61/904,822, filed on Nov. 15, 2013, (Continued)

(51) Int. Cl.
*G06F 16/25* (2019.01)
*G06F 16/27* (2019.01)
*G06F 16/28* (2019.01)

(52) U.S. Cl.
CPC ............ *G06F 16/284* (2019.01); *G06F 16/25* (2019.01); *G06F 16/258* (2019.01); *G06F 16/27* (2019.01); *G06F 16/256* (2019.01)

(58) Field of Classification Search
None
See application file for complete search history.

(56) References Cited

U.S. PATENT DOCUMENTS 5,577,188 A  11/1996  Zhu
5,608,872 A  3/1997  Schwartz
5,649,104 A  7/1997  Carleton
(Continued)

OTHER PUBLICATIONS

Final Office Action for U.S. Appl. No. 14/542,353 mailed Sep. 14, 2018, 13 pages.
(Continued)

*Primary Examiner* — Son T Hoang
(74) *Attorney, Agent, or Firm* — Kwan & Olynick LLP

(57) ABSTRACT

Systems and techniques for managing data in a relational database environment and a non-relational database environment. Data in the relational database environment that is static and to be maintained beyond a preselected threshold length of time is identified. The data is copied from the relational database and stored in the data the non-relational database. Access to the data is provided from the non-relational database via a user interface that accesses both the relational database and the non-relational database.

20 Claims, 5 Drawing Sheets

Related U.S. Application Data provisional application No. 61/904,826, filed on Nov. 15, 2013.

(56) References Cited

U.S. PATENT DOCUMENTS

| | | | |
|---|---|---|---|
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,884,299 A | 3/1999 | Ramesh |
| 5,918,159 A | 6/1999 | Fomukong |
| 5,963,953 A | 10/1999 | Cram |
| 6,092,083 A | 7/2000 | Brodersen |
| 6,169,534 B1 | 1/2001 | Raffel |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 7,197,520 B1 | 3/2007 | Matthews |
| 7,289,976 B2 | 10/2007 | Kihneman |
| 7,340,411 B2 | 3/2008 | Cook |
| 7,620,655 B2 | 11/2009 | Larsson |
| 7,958,159 B1 | 6/2011 | Tran |
| 9,104,762 B1 | 8/2015 | Ward |
| 9,143,341 B2 * | 9/2015 | Harrang .................. G06F 16/24 |
| 9,298,724 B1 * | 3/2016 | Patil ..................... G06F 16/1748 |
| 9,785,643 B1 | 10/2017 | Patil |
| 9,886,483 B1 * | 2/2018 | Harrison .................. G06F 16/28 |
| 2001/0044791 A1 | 11/2001 | Richter |
| 2002/0022986 A1 | 2/2002 | Coker |
| 2002/0029161 A1 | 3/2002 | Brodersen |
| 2002/0029376 A1 | 3/2002 | Ambrose |
| 2002/0035577 A1 | 3/2002 | Brodersen |
| 2002/0038313 A1 | 3/2002 | Klein |
| 2002/0042264 A1 | 4/2002 | Kim |
| 2002/0042843 A1 | 4/2002 | Diec |
| 2002/0069077 A1 | 6/2002 | Brophy |
| 2002/0072951 A1 | 6/2002 | Lee |
| 2002/0082892 A1 | 6/2002 | Raffel |
| 2002/0087552 A1 | 7/2002 | Applewhite |
| 2002/0129352 A1 | 9/2002 | Brodersen |
| 2002/0140731 A1 | 10/2002 | Subramaniam |
| 2002/0143997 A1 | 10/2002 | Huang |
| 2002/0152102 A1 | 10/2002 | Brodersen |
| 2002/0161734 A1 | 10/2002 | Stauber |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachandran |
| 2003/0069936 A1 | 4/2003 | Warner |
| 2003/0070000 A1 | 4/2003 | Coker |
| 2003/0070004 A1 | 4/2003 | Mukundan |
| 2003/0070005 A1 | 4/2003 | Mukundan |
| 2003/0074418 A1 | 4/2003 | Coker |
| 2003/0088545 A1 | 5/2003 | Subramaniam |
| 2003/0120625 A1 | 6/2003 | Jackson |
| 2003/0120675 A1 | 6/2003 | Stauber |
| 2003/0151633 A1 | 8/2003 | George |
| 2003/0159136 A1 | 8/2003 | Huang |
| 2003/0187921 A1 | 10/2003 | Diec |
| 2003/0189600 A1 | 10/2003 | Gune |
| 2003/0191743 A1 | 10/2003 | Brodersen |
| 2003/0204427 A1 | 10/2003 | Gune |
| 2003/0206192 A1 | 11/2003 | Chen |
| 2003/0225730 A1 | 12/2003 | Warner |
| 2003/0229610 A1 | 12/2003 | Van Treeck |
| 2004/0001092 A1 | 1/2004 | Rothwein |
| 2004/0010489 A1 | 1/2004 | Rio |
| 2004/0015981 A1 | 1/2004 | Coker |
| 2004/0027388 A1 | 2/2004 | Berg |
| 2004/0128001 A1 | 7/2004 | Levin |
| 2004/0186860 A1 | 9/2004 | Lee |
| 2004/0193510 A1 | 9/2004 | Catahan |
| 2004/0199489 A1 | 10/2004 | Barnes-Leon |
| 2004/0199536 A1 | 10/2004 | Barnes Leon |
| 2004/0199543 A1 | 10/2004 | Braud |
| 2004/0249854 A1 | 12/2004 | Barnes-Leon |
| 2004/0260534 A1 | 12/2004 | Pak |
| 2004/0260659 A1 | 12/2004 | Chan |
| 2004/0268299 A1 | 12/2004 | Lei |
| 2005/0050555 A1 | 3/2005 | Exley |
| 2005/0091098 A1 | 4/2005 | Brodersen |
| 2005/0149718 A1 | 7/2005 | Berlin |
| 2006/0218123 A1 * | 9/2006 | Chowdhuri ....... G06F 16/24532 |
| 2009/0177744 A1 | 7/2009 | Marlow |
| 2009/0222404 A1 | 9/2009 | Dolin |
| 2010/0076946 A1 | 3/2010 | Barker |
| 2010/0121941 A1 | 5/2010 | Harrang |
| 2010/0287346 A1 | 11/2010 | Schreter |
| 2011/0258178 A1 * | 10/2011 | Eidson ................. G06F 16/242 707/769 |
| 2011/0258179 A1 * | 10/2011 | Weissman ......... G06F 16/24537 707/713 |
| 2011/0258199 A1 | 10/2011 | Oliver |
| 2011/0258225 A1 * | 10/2011 | Taylor ................. G06F 16/2272 707/769 |
| 2011/0264681 A1 | 10/2011 | Kimberlin |
| 2011/0282839 A1 | 11/2011 | Paksoy |
| 2011/0282864 A1 | 11/2011 | Collins |
| 2011/0295839 A1 | 12/2011 | Collins |
| 2011/0314069 A1 * | 12/2011 | Alatorre ................ G06F 16/122 707/827 |
| 2012/0036146 A1 | 2/2012 | Annapragada |

(56) References Cited

U.S. PATENT DOCUMENTS

| | | | |
|---|---|---|---|
| 2012/0130973 A1 | 5/2012 | Tamm | |
| 2012/0179762 A1 | 7/2012 | Arora | |
| 2012/0310878 A1 | 12/2012 | Vuksan | |
| 2012/0311377 A1* | 12/2012 | Blood | G06F 16/00 714/4.12 |
| 2013/0024484 A1* | 1/2013 | Banerjee | G06F 16/28 707/822 |
| 2013/0103640 A1 | 4/2013 | Rehman | |
| 2014/0059311 A1* | 2/2014 | Oberhofer | G06F 16/90 |
| 2014/0122452 A1* | 5/2014 | Faerber | G06F 16/2455 707/693 |
| 2014/0149400 A1 | 5/2014 | Fu | |
| 2014/0164318 A1 | 6/2014 | Tsai | |
| 2014/0172914 A1* | 6/2014 | Elnikety | G06F 16/9024 707/774 |
| 2014/0214897 A1* | 7/2014 | Zhu | G06F 16/2455 707/771 |
| 2014/0337276 A1 | 11/2014 | Iordanov | |
| 2015/0134626 A1 | 5/2015 | Theimer | |
| 2015/0213109 A1* | 7/2015 | Kassko | G06F 16/2219 707/603 |

OTHER PUBLICATIONS

Notice of Allowance for U.S. Appl. No. 14/542,357 mailed Aug. 27, 2018, 9 pages.
Final Office Action for U.S. Appl. No. 14/542,357 mailed Feb. 27, 2018, 12 pages.
Non-Final Office Action for U.S. Appl. No. 14/542,342 mailed May 14, 2018, 5 pages.
Non-Final Office Action for U.S. Appl. No. 14/542,353 mailed Mar. 9, 2018, 11 pages.
Notice of Allowance for U.S. Appl. No. 14/542,348 mailed May 9, 2018, 9 pages.
Final Office Action for U.S. Appl. No. 14/542,342 mailed Aug. 28, 2017, 8 pages.
Final Office Action for U.S. Appl. No. 14/542,348 mailed Sep. 25, 2017, 18 pages.
Non-Final Office Action for U.S. Appl. No. 14/542,357 mailed Aug. 28, 2017, 12 pages.
Final Office Action for U.S. Appl. No. 14/542,357 mailed May 4, 2017, 13 pages.
Non-Final office Action for U.S. Appl. No. 14/542,342 mailed Jan. 9, 2017, 6 pages.
Non-Final office Action for U.S. Appl. No. 14/542,348 mailed Feb. 15, 2017, 13 pages.
Non-Final office Action for U.S. Appl. No. 14/542,353 mailed Apr. 4, 2017, 12 pages.
Non-Final office Action for U.S. Appl. No. 14/542,357 mailed Jan. 9, 2017, 10 pages.
Final Office Action for U.S. Appl. No. 14/542,338 mailed Sep. 7, 2018, 18 pages.
Non-Final Office Action for U.S. Appl. No. 14/542,338 mailed Mar. 13, 2018, 24 pages.
Final Office Action for U.S, U.S. Appl. No. 14/542,338 mailed Nov. 6, 2017, 17 pages.
Non-Final Office Action for U.S. Appl. No. 14/542,338 mailed Feb. 1, 2017, 14 pages.
Final Office Action for U.S. Appl. No. 14/542,353 mailed Oct. 23, 2017, 11 pages.
Non-Final Office Action for U.S. Appl. No. 14/542,353 mailed Mar. 22, 2019, 15 pages.
Notice of Allowance for U.S. Appl. No. 14/542,342 mailed May 22, 2019, 7 pages.
Final Office Action for U.S. Appl. No. 14/542,342 mailed Dec. 11, 2018, 5 pages.
Final Office Action for U.S. Appl. No. 14/133,431 mailed Aug. 25, 2017, 19 pages.
Non-Final Office Action for U.S. Appl. No. 14/133,431 mailed Feb. 26, 2018, 18 pages.
Non-Final Office Action for U.S. Appl. No. 14/133,431 mailed Oct. 5, 2018, 21 pages.
Notice of Allowance for U.S. Appl. No. 14/133,431 mailed Jun. 13, 2019, 14 pages.
Final Office Action for U.S. Appl. No. 14/133,431 mailed Apr. 22, 2016, 15 pages.
Non-Final Office Action for U.S. Appl. No. 14/133,431 mailed Aug. 26, 2015, 13 pages.
Non-Final Office Action for U.S. Appl. No. 14/133,431 mailed Feb. 13, 2017. 16 pages.
Non-Final Office Action for U.S. Appl. No. 16/112,538 mailed Sep. 16, 2019, 23 pages.
Notice of Allowance for U.S. Appl. No. 14/133,431 mailed Sep. 24, 2019, 14 pages.
Notice of Allowance for U.S. Appl. No. 14/542,353 mailed Dec. 18, 2019, 19 pages.
Final Office Action for U.S. Appl. No. 14/542,353 mailed Sep. 11, 2018, 12 pages.
Final Office Action for U.S. Appl. No. 14/542,353 mailed Sep. 9, 2019, 13 pages.
Notice of Allowance for U.S. Appl. No. 14/542,357 mailed Dec. 3, 2018, 3 pages.
Notice of Allowance for U.S. Appl. No. 16/112,538 mailed Jan. 8, 2020, 9 pages.
Non-Final Office Action for U.S. Appl. No. 16/442,409 mailed May 26, 2021, 6 pages.
Non-Final Office Action for U.S. Appl. No. 16/553,067 mailed May 13, 2021, 14 pages.
Notice of Allowance for U.S. Appl. No. 16/553,067 mailed Aug. 6, 2021, 8 pages.
Non-Final Office Action for U.S. Appl. No. 16/853,572 mailed Jul. 23, 2021, 23 pages.
Non-Final Office Action for U.S. Appl. No. 16/883,810 mailed Jul. 9, 2021, 17 pages.
Final Office Action for U.S. Appl. No. 16/883,810 mailed Oct. 15, 2021, 11 pages.
Notice of Allowance for U.S. Appl. No. 16/853,572 mailed Aug. 22, 2022, 17 pages.
Final Office Action for U.S. Appl. No. 16/853,572 mailed Mar. 9, 2022, 23 pages.
Notice of Allowance for U.S. Appl. No. 16/442,409 mailed Sep. 14, 2022, 8 pages.
Non-Final Office Action for U.S. Appl. No. 16/442,409 mailed Apr. 13, 2022, 10 pages.
Final Office Action for U.S. Appl. No. 16/442,409 mailed Dec. 21, 2021, 8 pages.
Office Action (Non-Final Rejection) dated Jul. 7, 2023 for U.S. Appl. No. 18/049,117 (pp. 1-26).
Office Action (Final Rejection) dated Nov. 17, 2023 for U.S. Appl. No. 18/049,117 (pp. 1-12).
Office Action (Notice of Allowance and Fees Due (PTOL-85)) dated Apr. 2, 2024 for U.S. Appl. No. 18/049,117 (pp. 1-15).
Office Action (Non-Final Rejection) dated Apr. 3, 2025 for U.S. Appl. No. 18/820,079 (pp. 1-33).

* cited by examiner

TECHNIQUES FOR DATA RETENTION

CLAIM OF PRIORITY

This application is a continuation of and claims priority to U.S. application Ser. No. 18/049,117, entitled "TECHNIQUES FOR DATA RETENTION," filed Oct. 24, 2022, which is a continuation of, and claims priority to U.S. application Ser. No. 16/853,572, entitled "TECHNIQUES FOR DATA RETENTION," filed Apr. 20, 2020, which is a continuation of, and claims priority to, U.S. application Ser. No. 14/542,353 entitled "TECHNIQUES FOR DATA RETENTION," filed Nov. 14, 2014, now U.S. Pat. No. 10,628,387 with an issue date of Apr. 21, 2020, which is related to, and claims priority to provisional utility application No. 61/905,460 entitled "FIELD HISTORY RETENTION," filed Nov. 18, 2013; provisional utility application No. 61/904,822 entitled "SCALABLE OBJECTS," filed on Nov. 15, 2013; provisional utility application No. 61/904,826 entitled "MULTI-TENANCY FOR A NOSQL DATABASE," filed Nov. 15, 2013; provisional utility application No. 61/905,439 entitled "BIG OBJECTS," filed Nov. 18, 2013; and provisional utility application No. 61/905,457 entitled "ORCHESTRATION BETWEEN TWO MULTI-TENANT DATABASES," filed Nov. 18, 2013, the entire contents of which are all incorporated herein by reference.

TECHNICAL FIELD

Embodiments relate to techniques for storage and management of data. More particularly, embodiments relate to selectively retaining data based on preselected characteristics.

BACKGROUND

Relational databases are commonly used to store large amounts of data. Current relational database systems have limits beyond which the system does not scale well. Thus, environments in which large amount of data must be managed (e.g., on-demand services environments, multitenant database environments, electronic commerce, logistics) may near or reach conditions in which the relational database becomes less effective. Accordingly, current relational database management systems are not ideal in some situations.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
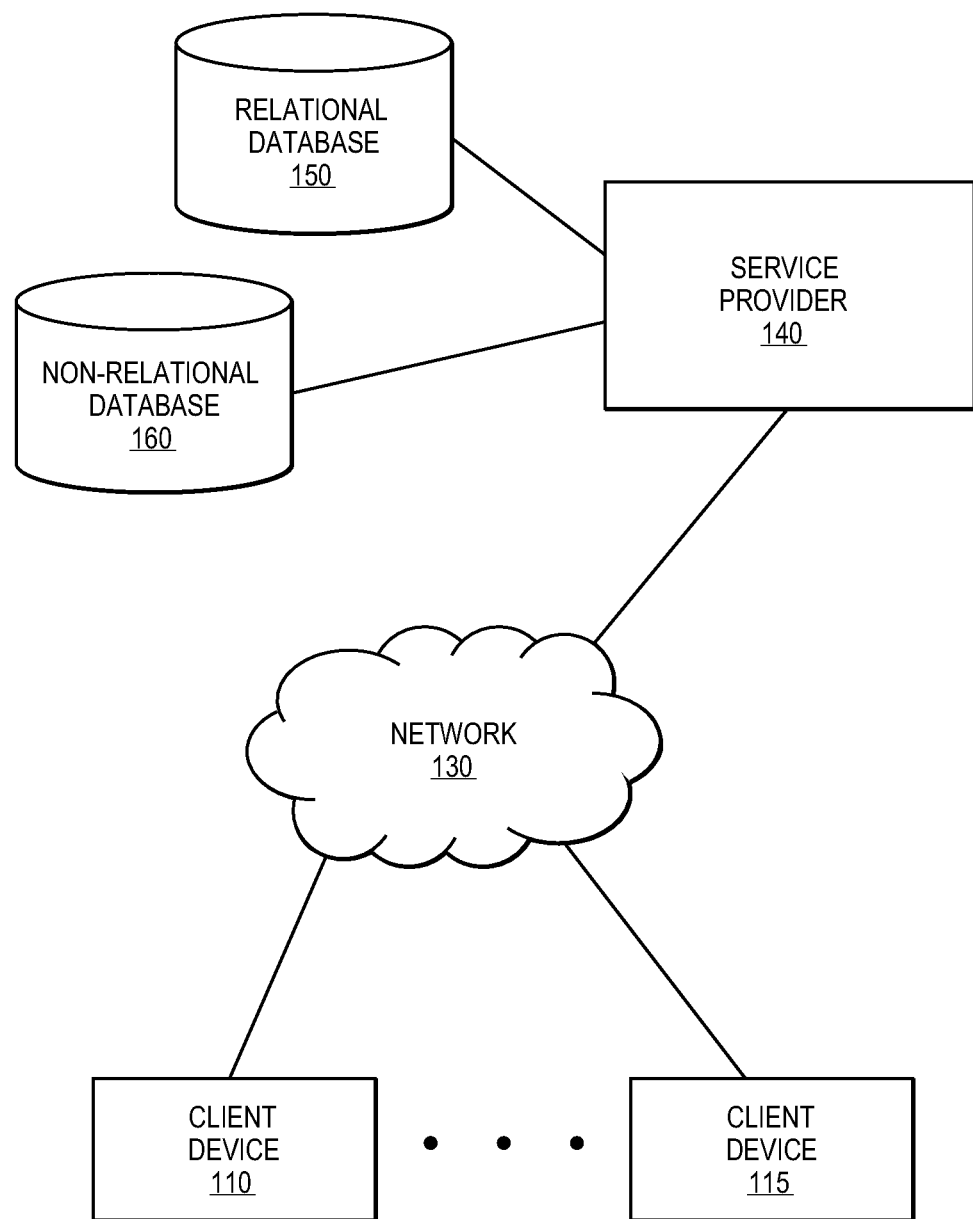
FIG. 1 is a block diagram of one embodiment of an architecture that may provide data retention as described herein.

In the following description, numerous specific details are set forth. However, embodiments of the invention may be practiced without these specific details. In other instances, well-known circuits, structures and techniques have not been shown in detail in order not to obscure the understanding of this description.

As discussed above, there are conditions and/or situations in which a relational database system is being used to manage large amounts of data that does not require the functionality of a relational database system, but is related to data that does. The examples that follow are presented in terms of field history and field history archives; however, the techniques described herein are not limited to these examples.

When records are edited or modified in a relational database environment, entries corresponding to the change can be made. For example, an initial account record may be:

| Account ID | Account Name | Expected Value |
|---|---|---|
| 123456789 | Acme, Inc. | $1,000,000 |

The account record can then me modified, for example, to:

| Account ID | Account Name | Expected Value |
|---|---|---|
| 123456789 | Acme Systems, Inc. | $2,000,000 |

The corresponding field history information can be maintained in another table:

| Field History ID | Parent ID | Old Value | New Value |
|---|---|---|---|
| 0000000001 | 123456789 | Acme, Inc. | Acme Systems, Inc. |
| 000000002 | 123456789 | $1,000,000 | $2,000,000 |

In this simplified example, for each column in the original object that is changed a row is generated in the history table. The history table can be useful for keeping an audit trail, for example With an active environment, the history can grow to a very large number of rows quickly. However, because the data is static after creation and the data is not frequently accessed, the features and flexibility provided by a relational database system may be unused. Thus, a different, more scalable database structure can be utilized for these types of data.

In one embodiment, this type of information can be stored on a non-relational database, for example, Apache HBase, which is an open source non-relational distributed database. Other databases can also be supported. In one embodiment, a JAVA® Database Connectivity (JDBC) driver can be utilized to support low-latency SQL queries to run over the data stored in the non-relational database (e.g., HBase).

A non-relational database can provide better horizontal scalability than a relational database model and provide linear access characteristics, and simpler read and write semantics. In one embodiment, one or more HBase databases can be integrated into a platform (e.g., salesforce) using a framework or interface (e.g., External Objects in salesforce) that allows for data from external sources to be utilized in the platform. In one embodiment, the framework/ interface allows for the external database/resource to appear to a user as if it were a part of the platform.

In one embodiment, transfer of data from the relational database environment to the non-relational database environment is not continuous. Transfer of data can occur in response to a request and/or in response to a set of one or more preselected conditions, which can include, for example, exceeding a threshold number of rows in a table, exceeding a threshold database size, and/or available bandwidth. Other conditions can also be used.

In one embodiment, the techniques described herein are provided within a multitenant database environment. Within a multitenant database environment, the conditions that trigger transfer or data and/or the format of the data may vary from tenant to tenant. In one embodiment, each tenant of the multitenant database can have a custom interface that can be utilized to access information in the relational database environment as well as the non-relational database environment.

In one embodiment, the functionality described herein operates to provide a query agent with a JDBC application programming interface (API) from the perspective of a client device. The query agent operates to translate a SQL query (e.g., passed through as a string in the JDBC API) into a series of "native" NoSQL store APIs. In one embodiment, the API to the NoSQL store is at a lower level, so the techniques described herein allow a higher-level query language (e.g., SQL) to be used to read/write data and manage schemas. Various architectures are provided in the description that follows.

FIG. 1 is a block diagram of one embodiment of an architecture that may provide data retention as described herein. In one embodiment, client devices are used by one or more users to access services from a service provider. The service provided can be, for example, an on-demand services environment, a multitenant database environment, or any other type of service provider.

Client devices 110 and 115 operate to allow a user to access remote services provided by service provider 140 via network 130. Client devices 110 can be, for example, desktop computers, laptop computers, tablets, smart phones, thin clients, etc. Network 130 can be any network, for example, the Internet, a corporate local area network or wide area network, a cellular network, and/or any combination thereof.

Service provider 140 can be any number of servers and/or other devices that operate to provide services to one or more client devices. In one embodiment, service provider 140 operates with one or more relational databases (e.g., 150) and one or more non-relational databases (e.g., 160). Service provider 140 operates using relational database 150 and non-relational database 160 as described above.

In one embodiment, service provider 140 is an on-demand services environment with multiple client organizations that provides different and/or different levels of services to the client organizations. For example, service provider 140 can be a multitenant database environment that provides custom interfaces and data isolation to the different client organizations. In the example, multitenant database environment, the transfer of data from relational database 150 and non-relational database 160 can be on an organization-by-organization basis with different parameters and/or conditions for different organizations.

Figure 2:
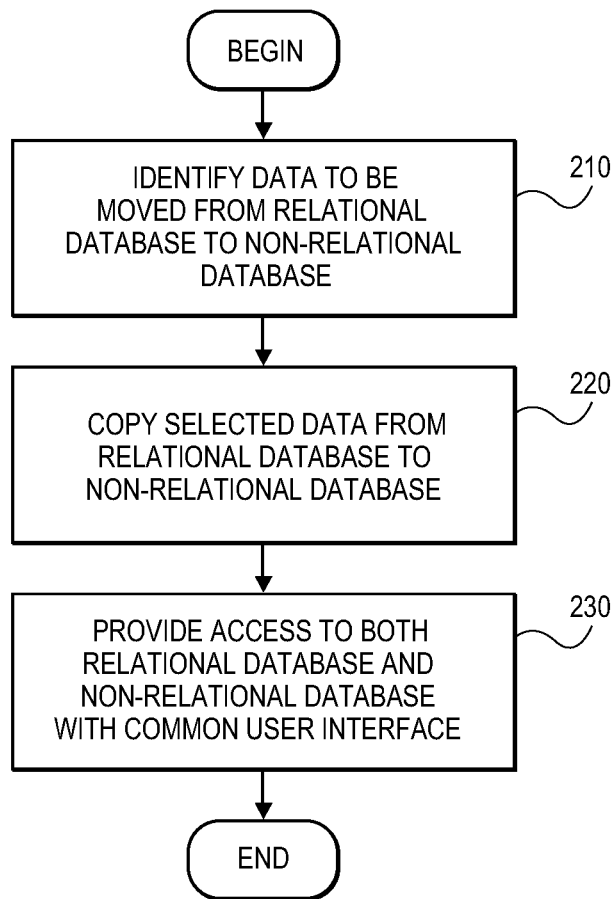
FIG. 2 is a flow diagram of one embodiment of a technique for transferring data from a relational database environment to a non-relational database environment.

FIG. 2 is a flow diagram of one embodiment of a technique for transferring data from a relational database environment to a non-relational database environment. Data to be moved from the relational database environment to the non-relational database environment is identified, 210. Various parameters and conditions are used to determine what data is to be moved/copied/transferred.

In a multitenant database example, not all organizations/ tenants may have the functionality to copy data from the relational database to the non-relational database as described. That is, the functionality may be provided on a tenant-by-tenant basis. Further, the fields and/or data that can be copied can be limited/determined/etc. on a tenant-by-tenant basis. In one embodiment, the data to be copied for a particular tenant is based on a key prefix and/or date (e.g., field history, older than a specified date).

The selected data is copied from the relational database to the non-relational database, 220. In one embodiment, a message is enqueued with the parameters (e.g., field history, older than a specified date) for the data to be copied. In one embodiment, the message is used to handle copying of the data in batches. For example, when a chunk of rows has been processed, the message (or a variation) is enqueued again to handle the next chunk of rows until all of the specified data has been copied.

In one embodiment, a chunk of data to be copied is delineated by a data range and an offset. The offset is used to prevent re-loading of rows that have already been copied. In one embodiment, when the selected data has been copied, a message handler marks the current job as successful and can insert a row in the source table to help track what data has been copied. Data can then be deleted from the relational database.

Access to the copied data is then provided with a common user interface, 230, so that the user has access to the copied data that is stored in the non-relational database environment. In one embodiment, the interface providing access to the relational database environment also includes virtual entity or other interface to the non-relational database to allow the user seamless access to data copied from the relational database environment to the non-relational database environment.

In contrast to turning SQL queries into batch-oriented map/reduce jobs, the techniques described herein can be utilized to transform the SQL queries into a set of HBase (or other non-relational database) scans that can be executed in parallel for each row key range. In one embodiment, these scans are executed in parallel for each row key range and can be combined to provide results of the query. As a result, the latency of the queries is low enough to allow data to drive analytic-type queries over large amounts of data. In one embodiment, all this is hidden behind a JDBC driver. In one embodiment, the user provides a schema for their database table data and a SQL query. In one embodiment, column values can be mapped to individual Key Values and/or combined together in a single Key Value to reduce the size of data, which can improve read speed.

Figure 3:
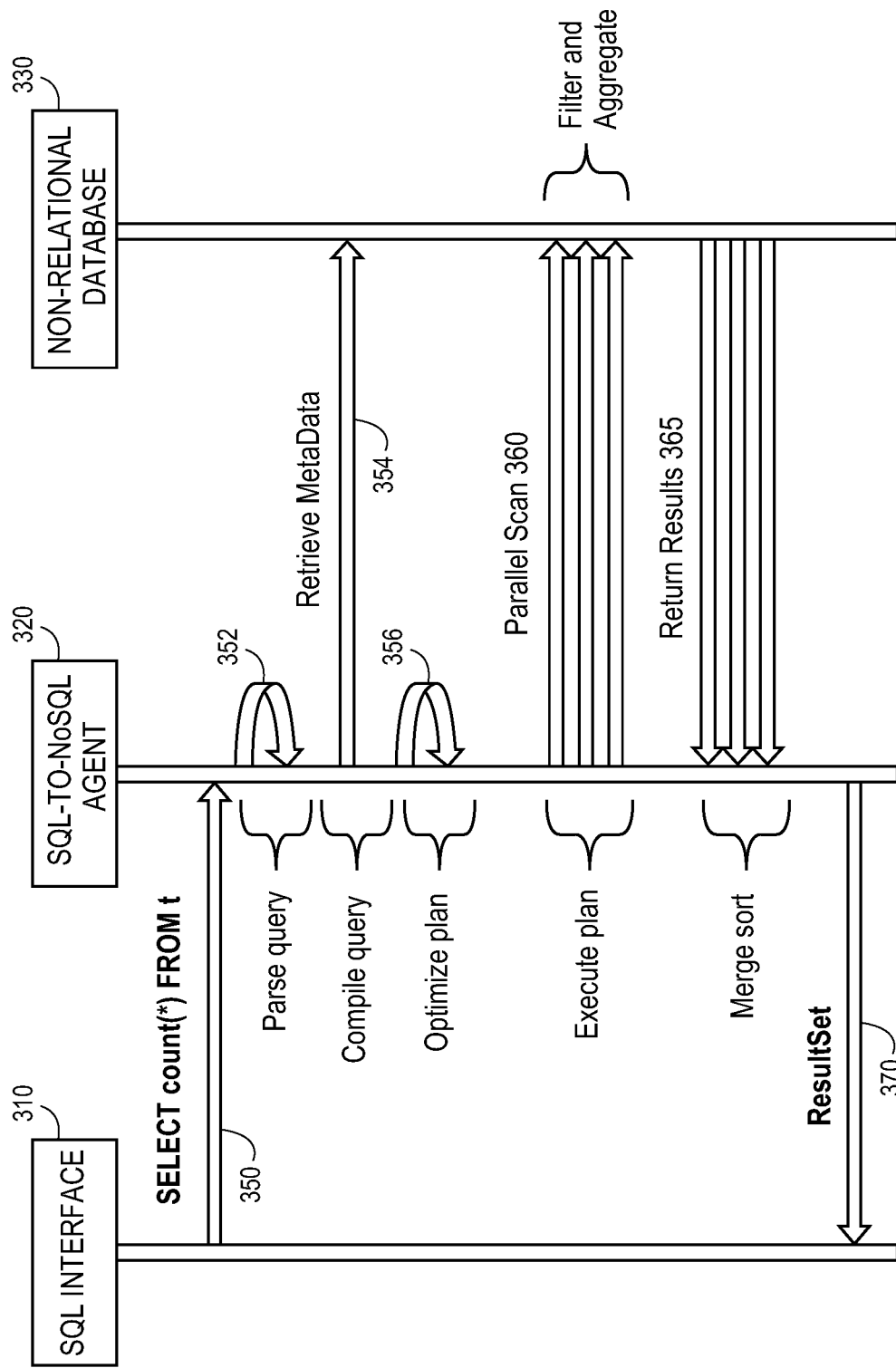
FIG. 3 is an interaction diagram of one embodiment of a technique for querying a non-relational (NoSQL) database using relational database (SQL) commands.

FIG. 3 is an interaction diagram of one embodiment of a technique for querying a non-relational (NoSQL) database using relational database (SQL) commands. In one embodiment, the technique of FIG. 3 is performed within a multitenant database environment. SQL interface 310 is any type of interface/client device that can be used to receive SQL commands and provide results form the SQL commands. For example, SQL interface 310 can be a SQL application running on a client computing device. SQL-to-NoSQL agent 320 provides the functionality described herein. SQL-to-NoSQL agent 320 may be a centralized single agent or can be distributed over multiple entities. Non-relational database 330 can be any type of non-relational database, for example, HBase.

In response to receiving at least one SQL command representing a query, SQL interface 310 sends the query, 350, to SQL-to-NoSQL agent 320. In response to receiving the SQL command, SQL-to-NoSQL agent 320 parses the query, 352. SQL-to-NoSQL agent 320 then compiles a query, which can include retrieving metadata, 354, from non-relational database 330. The query plan can be optimized, 356. In one embodiment the SQL query is transformed into one or more scans that are relatively simple, for example, with no joins, basic filtering and/or simple aggregation.

In one embodiment, the scans can be run on a sub-section of tables so that not all tables need to be replicated in the non-relational database. In some embodiments, the results need only be approximately correct. Other optimizations can be utilized to provide the desired level of performance.

The query plan can be executed as multiple parallel scans, 360, of non-relational database 330. In one embodiment, a set of HBase (or other non-relational database) scans that can be executed in parallel for each row key range. In one embodiment, these scans are executed in parallel for each row key range and can be combined to provide results of the query.

In one embodiment, non-relational database 330 can perform filtering and/or aggregation. Results of the multiple parallel scans are returned, 365, to SQL-to-NoSQL agent 320. In one embodiment, SQL-to-NoSQL agent 320 can perform merge sorting on the results. By combining the results of the one or more scans, the system can provide an aggregated/unified result to the original SQL query. The results are provided, 370, to SQL interface 310.

In one embodiment, deletion from the relational database environment is decoupled from the copy process. In embodiment, a system job in the relational database environment periodically (e.g., daily, weekly, 12 hours) runs to query tenants/organizations that have the functionality described herein enabled to determine whether any data copy jobs have been completed. If so, the data that has been copied to the non-relational database environment may be deleted from the relational database environment.

In one embodiment, when a deletion message/job is processed, the handler determines the parameters (e.g., field history, older than a specified date) for the deletion request. In one embodiment, this is accomplished with a system-level job. It can, for example, run a query to find all organizations that have post-archival deletion enabled and have post-archival deletion requests that have not been processed. In one embodiment, the system-level job can enqueue a message for each combination. In one embodiment, other job types (e.g., an organization-level job) can be utilized to process deletions.

The non-relational database can be queried to determine the data within the specified range. For each chunk, the handler passes identifiers loaded from the non-relational database environment to the relational database environment to cause a hard delete of the corresponding rows from the relational database environment. Loading the identifiers from the non-relational database environment to the relational database environment ensures that data will not be deleted before being successfully copied from the relational database environment to the non-relational database environment.

Figure 4:
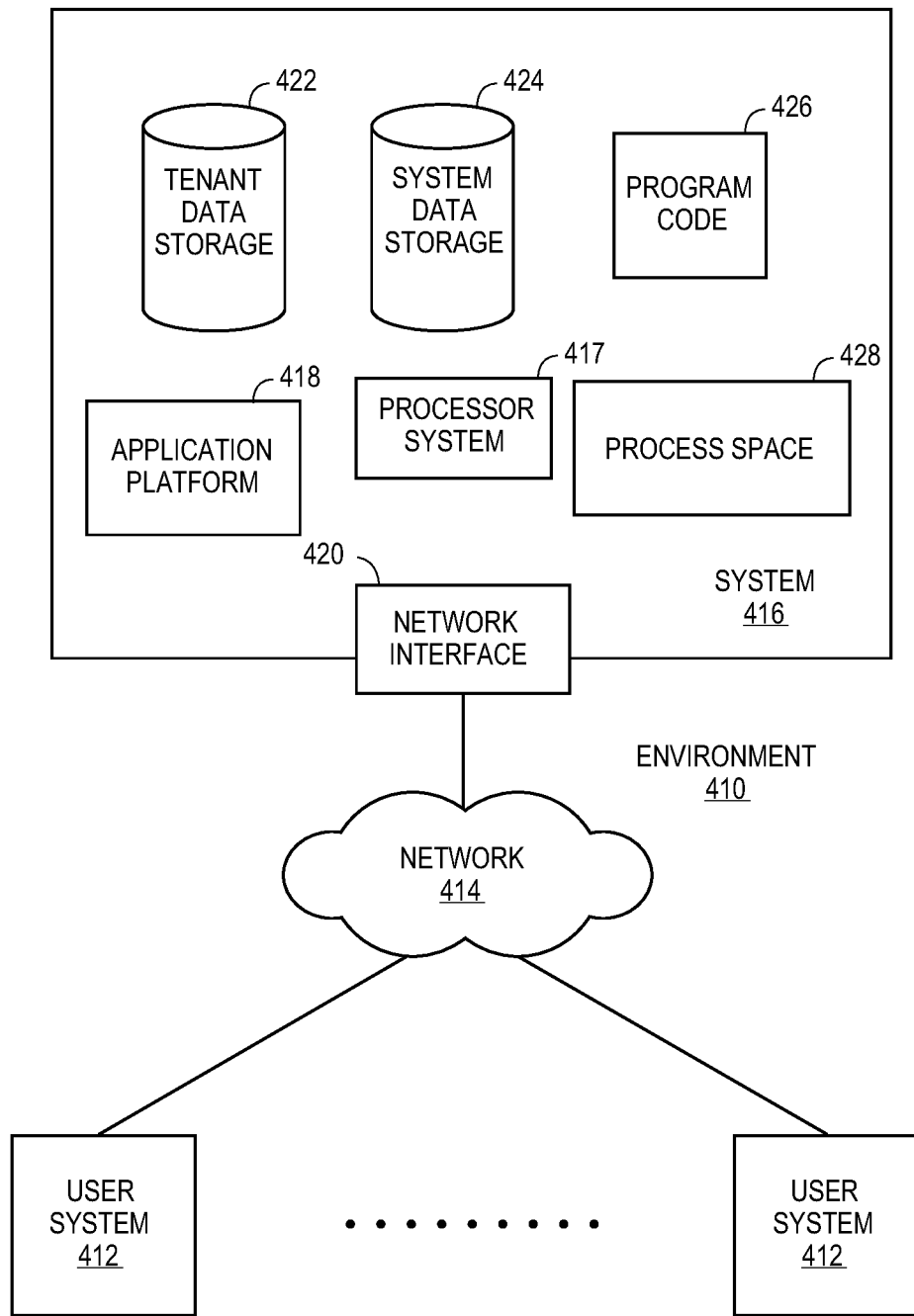
FIG. 4 is a block diagram of one environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
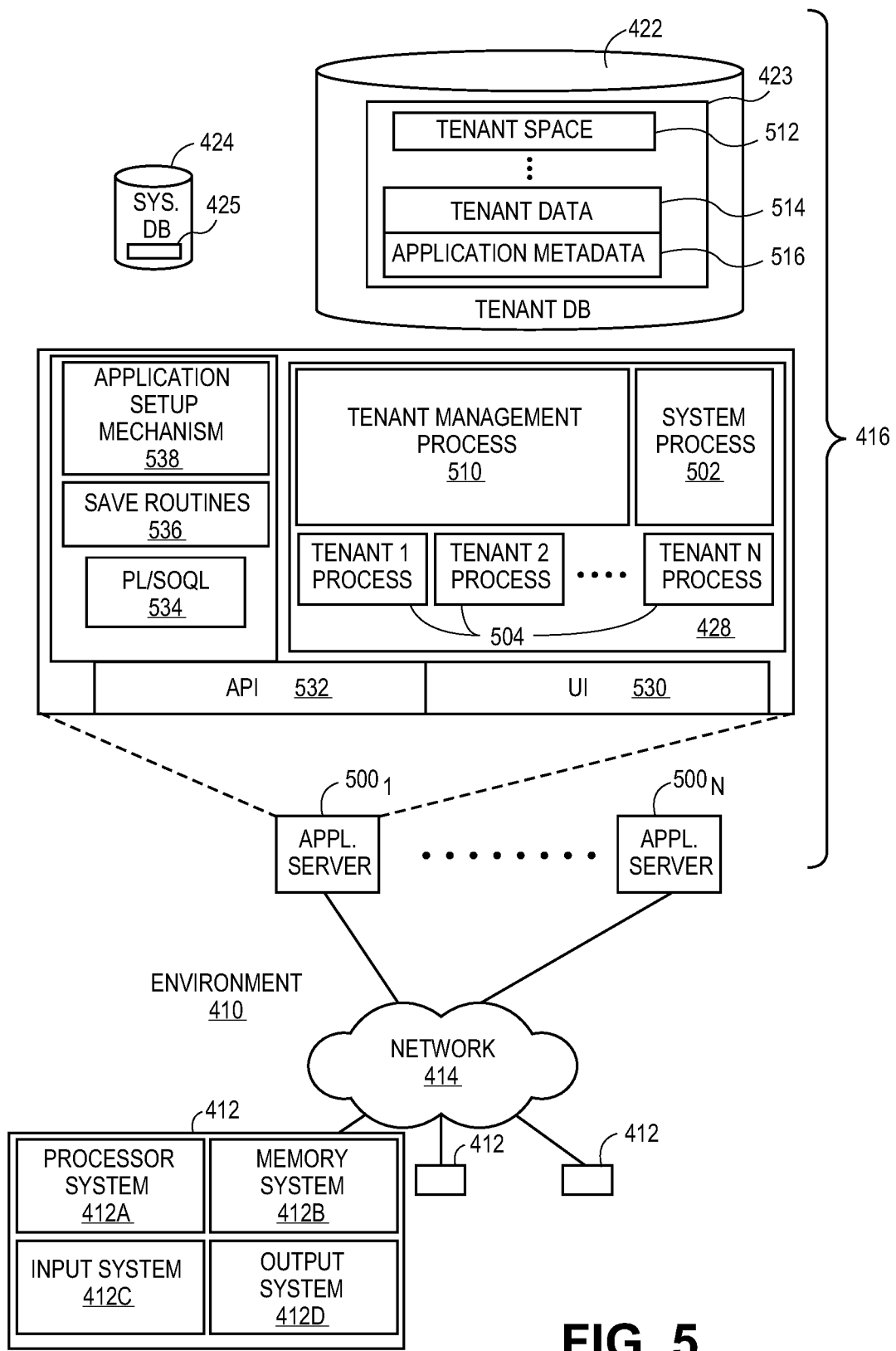
FIG. 5 is a block diagram of one embodiment of elements of environment of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010, to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multitenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:
    obtaining, by a data retention system implemented via a database system, a data retention policy associated with a tenant of a multitenant computing environment, the data retention policy indicating one or more parameters associated with temporal attributes of data to be copied from a relational database to a non-relational database;
    enqueuing a job corresponding to first data, the job including the one or more parameters;
    copying at least a portion of the first data, identified from the relational database based on the enqueued job, to the non-relational database, wherein the job is enqueued again until backup of the first data in the non-relational database is complete;
    obtaining a query received via a user interface, the query being received in a relational database language;
    using the query received in the relational database language to scan the non-relational database using data of the relational database and data of the non-relational database;
    combining results of the query on the non-relational database; and
    providing the combined results via the user interface.

2. The method of claim 1, wherein the one or more parameters include: weekly backup retention, monthly backup retention, yearly backup retention, and/or week of year backup retention.

3. The method of claim 1, wherein the data retention policy specifies how frequently backups are created.

4. The method of claim 1, wherein the job is a background job that is independent of the database system.

5. The method of claim 1, further comprising:
    performing, in parallel, multiple scans of the non-relational database.

6. The method of claim 1, further comprising:
providing, to an application, access to application data stored on a server system of the data retention system, the application data being stored in a non-relational format.

7. The method of claim 1, wherein the non-relational database is stored in a columnar format.

8. A data retention system, comprising:
a database system implemented using at least a server computing device, the database system configurable to cause:
obtaining, by the data retention system, a data retention policy associated with a tenant of a multitenant computing environment, the data retention policy indicating one or more parameters associated with temporal attributes of data to be copied from a relational database to a non-relational database;
enqueuing a job corresponding to first data, the job including the one or more parameters;
copying at least a portion of the first data, identified from the relational database based on the enqueued job, to the non-relational database, wherein the job is enqueued again until backup of the first data in the non-relational database is complete;
obtaining a query received via a user interface, the query being received in a relational database language;
using the query received in the relational database language to scan the non-relational database using data of the relational database and data of the non-relational database;
combining results of the query on the non-relational database; and
providing the combined results via the user interface.

9. The system of claim 8, wherein the one or more parameters include: weekly backup retention, monthly backup retention, yearly backup retention, and/or week of year backup retention.

10. The system of claim 8, wherein the data retention policy specifies how frequently backups are created.

11. The system of claim 8, wherein the job is a background job that is independent of the database system.

12. The system of claim 8, further comprising:
performing, in parallel, multiple scans of the non-relational database.

13. The system of claim 8, the database system further configurable to cause:
providing, to an application, access to application data stored on a server system of the data retention system, the application data being stored in a non-relational format.

14. The system of claim 8, wherein the non-relational database is stored in a columnar format.

15. A computer program product comprising computer-readable program code capable of being executed by one or more processors when retrieved from a non-transitory computer-readable medium, the computer-readable program code comprising computer-readable instructions configurable to cause:
obtaining, by a data retention system implemented via a database system, a data retention policy associated with a tenant of a multitenant computing environment, the data retention policy indicating one or more parameters associated with temporal attributes of data to be copied from a relational database to a non-relational database;
enqueuing a job corresponding to first data, the job including the one or more parameters;
copying at least a portion of the first data, identified from the relational database based on the enqueued job, to the non-relational database, wherein the job is enqueued again until backup of the first data in the non-relational database is complete;
obtaining a query received via a user interface, the query being received in a relational database language;
using the query received in the relational database language to scan the non-relational database using data of the relational database and data of the non-relational database;
combining results of the query on the non-relational database; and
providing the combined results via the user interface.

16. The computer program product of claim 15, wherein the one or more parameters include: weekly backup retention, monthly backup retention, yearly backup retention, and/or week of year backup retention.

17. The computer program product of claim 15, wherein the data retention policy specifies how frequently backups are created.

18. The computer program product of claim 15, wherein the job is a background job that is independent of the database system.

19. The computer program product of claim 15, further comprising: performing, in parallel, multiple scans of the non-relational database.

20. The computer program product of claim 15, wherein the non-relational database is stored in a columnar format.

* * * * *